United States Patent
Wang et al.

(10) Patent No.: US 11,275,387 B2
(45) Date of Patent: Mar. 15, 2022

(54) COACH APPARATUS AND COOPERATIVE OPERATION CONTROLLING METHOD FOR COACH-DRIVEN MULTI-ROBOT-COOPERATIVE OPERATION SYSTEM

(71) Applicant: Institute For Information Industry, Taipei (TW)

(72) Inventors: Ping-Feng Wang, Taipei (TW); Jong-Yih Kuo, Yilan County (TW); Chen-Ti Wang, Tainan (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 397 days.

(21) Appl. No.: 16/216,341

(22) Filed: Dec. 11, 2018

(65) Prior Publication Data
US 2020/0166952 A1    May 28, 2020

(30) Foreign Application Priority Data
Nov. 27, 2018 (TW) ................. 107142286

(51) Int. Cl.
*G05D 1/02* (2020.01)
*G07C 5/00* (2006.01)

(52) U.S. Cl.
CPC ......... *G05D 1/0295* (2013.01); *G05D 1/0221* (2013.01); *G05D 1/0289* (2013.01); *G07C 5/008* (2013.01); *G05D 2201/02* (2013.01)

(58) Field of Classification Search
CPC .............. G05D 1/0295; G05D 1/0221; G05D 2201/02; G05D 1/0289; G07C 5/008
(Continued)

(56) References Cited

U.S. PATENT DOCUMENTS

| | | | |
|---|---|---|---|
| 6,904,335 B2* | 6/2005 | Solomon | F41H 13/00 318/568.11 |
| 9,527,211 B2* | 12/2016 | Posselius | G05B 19/402 |
| 10,826,932 B2* | 11/2020 | Abbaszadeh | G06N 20/00 |

OTHER PUBLICATIONS

T. Yasuda, K. Ohkura and K. Yamada, "Multi-robot Cooperation Based on Continuous Reinforcement Learning with Two State Space Representations," 2013 IEEE International Conference on Systems, Man, and Cybernetics, 2013, pp. 4470-4475, doi: 10.1109/SMC.2013.760. (Year: 2013).*

(Continued)

*Primary Examiner* — Khoi H Tran
*Assistant Examiner* — Rodney P King
(74) *Attorney, Agent, or Firm* — CKC & Partners Co., LLC

(57) ABSTRACT

A coach apparatus and a cooperative operation controlling method for a coach-driven multi-robot cooperative operation system are provided. The coach apparatus connects with a plurality of action robots and receives state space data from each action robot. The coach apparatus divides the action robots into a plurality of action group. The coach apparatus reduces the state space data of the action robots in each action group to generate reduced state space data of each action group, and trains and builds a cooperative model based on the reduced state space data. In addition, for each action group, the coach apparatus selects a group strategy based on the reduced state space data, and transmits the cooperative model and the group strategy to the action robots in the action group to make them carry out an action mission according to the cooperative model and the group strategy.

20 Claims, 6 Drawing Sheets

(58) Field of Classification Search
USPC .......................................................... 700/245
See application file for complete search history.

(56) References Cited

OTHER PUBLICATIONS

Limebeer, 2007, Modelling and Model Reduction—State Space Truncation—2007, Springer-Verlag Berlin Heidelberg, pp. 99-122.*

* cited by examiner

COACH APPARATUS AND COOPERATIVE OPERATION CONTROLLING METHOD FOR COACH-DRIVEN MULTI-ROBOT-COOPERATIVE OPERATION SYSTEM

PRIORITY

This application claims priority to Taiwan Patent Application No. 107142286 filed on Nov. 27, 2018, which is hereby incorporated by reference in its entirety.

FIELD

The present invention relates to a coach apparatus and a cooperative operation controlling method for a coach-driven multi-robot cooperative operation system. Specifically, the coach apparatus of the present invention divides a plurality of action robots into a plurality of action groups, and reduces the data amount required for training a cooperative model by reducing the state space data of the action robots in each of the action groups.

BACKGROUND

With the development of science and technology, robots have gradually found application in people's life to assist people in performing various tasks. In recent years, warehouse robots have become very popular all over the world, and electronic commerce (E-commerce) operators can effectively manage the warehouse and save required labor by using warehouse robots, e.g., using the warehouse robots to sort, transport or place goods. In addition to warehouse management, robots can also find application in port drifts cleaning, inspection, manhunt, obstacle avoidance or the like.

In the aforesaid applications, robots need to accomplish the goal task through cooperative operation. However, the cooperative operation of the conventional robots is based on state-action control and cannot plan optimal obstacle avoiding paths in real time, so it is hard to bear the cooperative operation for obstacle avoidance of multiple robots, and finally a problem of freezing robot occurs. Moreover, the cooperative operation problems of moving and processing of the robots (e.g., avoiding collision, manhunt, co-cleaning or the like) also need rapid response within a short time. Accordingly, an urgent need exists in the art to provide a cooperative operation mechanism, which is capable of reducing the data calculating amount and providing optimal cooperative operation behaviors and response time.

SUMMARY

Provided is a cooperative operation mechanism, which reduces the data amount required for training a cooperative model by dividing a plurality of action robots into a plurality of action groups and reducing the state space data of the action robots in each of the action groups. Accordingly, the data calculating amount required for the cooperative operation of the robots and providing optimal cooperative operation behaviors and response time can be reduced.

The disclosure includes a coach apparatus for a coach-driven multi-robot cooperative operation system, which comprises a storage, a communication interface and a processor. The storage is configured to store a reduced state space model, a cooperative learning model and a strategy base. The communication interface is configured to connect with a plurality of action robots. The processor is electrically connected to the storage and the communication interface and is configured to execute the following operations: receiving state space data and goal information from each of the action robots via the communication interface; dividing the action robots into a plurality of action groups according to the goal information and the state space data; inputting the state space data to the reduced state space model to generate a plurality of reduced state space data, wherein each of the reduced state space data corresponds to one of the action groups, and each of the reduced state space data is generated through integrating at least one the state space data of at least one the action robots in the corresponding action group; inputting the reduced state space data to the cooperative learning model to train and build a cooperative model; for each of the action groups, selecting a group strategy from the strategy base according to the reduced state space data; and for each of the action groups, transmitting the cooperative model and the group strategy to each of the action robots in the action group via the communication interface to make each of the action robots in the action group carry out an action mission according to the cooperative model and the group strategy.

The disclosure also includes a cooperative operation controlling method. The cooperative operation controlling method is adapted for use in a coach apparatus for a coach-driven multi-robot cooperative operation system. The coach apparatus comprises a storage, a communication interface and a processor. The storage stores a reduced state space model, a cooperative learning model and a strategy base. The communication interface connects with a plurality of action robots. The cooperative operation controlling method is executed by the processor and comprises the following steps: receiving state space data and goal information from each of the action robots via the communication interface; dividing the action robots into a plurality of action groups according to the goal information and the state space data; inputting the state space data to the reduced state space model to generate a plurality of reduced state space data, wherein each of the reduced state space data corresponds to one of the action groups, and each of the reduced state space data is generated through integrating at least one the state space data of at least one the action robots in the corresponding action group; inputting the reduced state space data to the cooperative learning model to train and build a cooperative model; for each of the action groups, selecting a group strategy from the strategy base according to the reduced state space data; and for each of the action groups, transmitting the cooperative model and the group strategy to each of the action robots in the action group via the communication interface to make each of the action robots in the action group carry out an action mission according to the cooperative model and the group strategy.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional proportions among individual elements in the attached drawings are provided only for ease of understanding, but not to limit the actual scale of the present invention.

Figure 1:
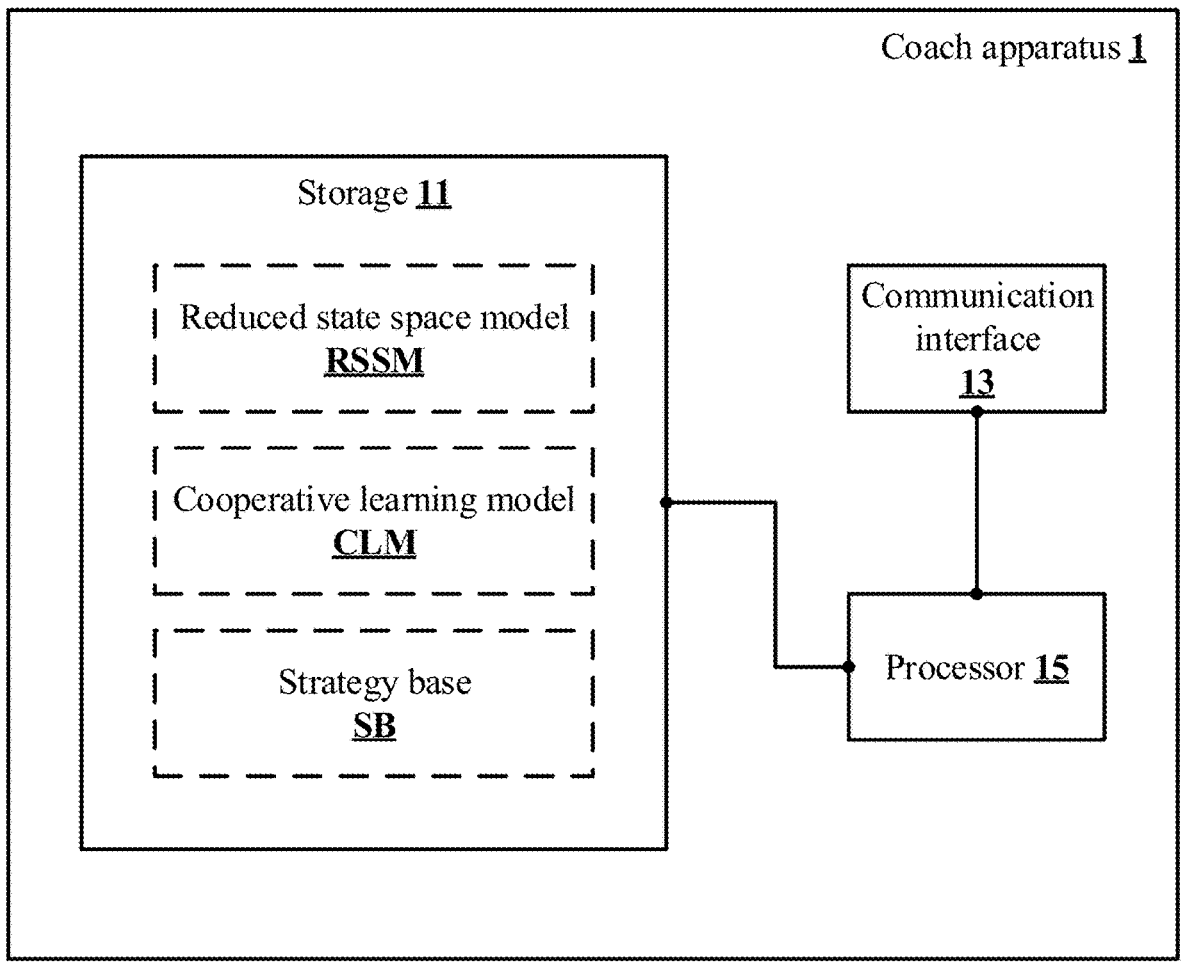
FIG. 1 is a schematic view of a coach apparatus 1 according to the present invention.
Figure 2:
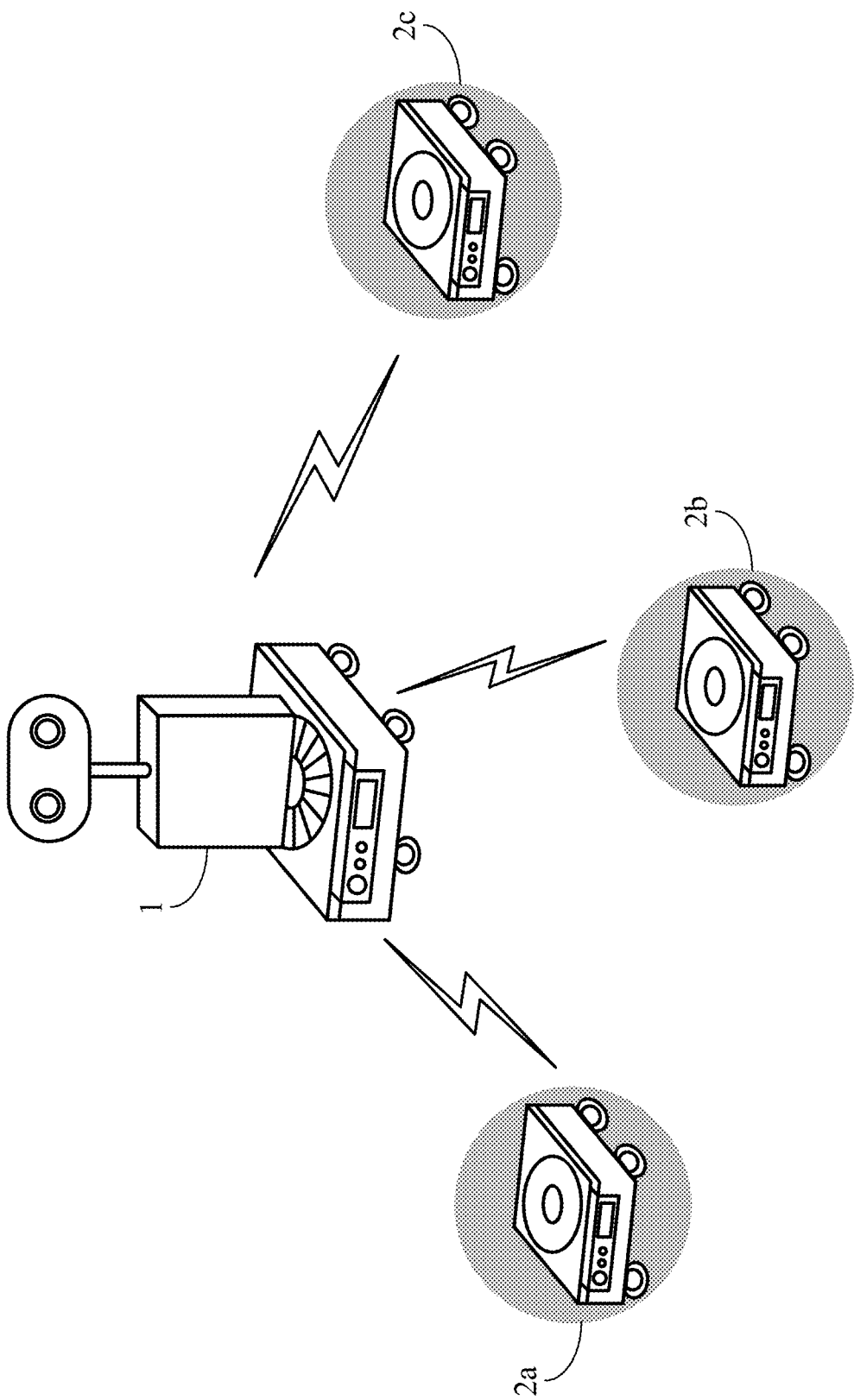
FIG. 2 depicts an implementation scenario of a coach-driven multi-robot cooperative operation system according to the present invention.

A first embodiment of the present invention is as shown in FIG. 1 to FIG. 3. FIG. 1 is a schematic view of a coach apparatus 1 according to the present invention. The coach apparatus 1 is adapted for use in a coach-driven multi-robot cooperative operation system, as shown in FIG. 2. The coach-driven multi-robot cooperative operation system may comprise at least one action robot (e.g., action robots 2a, 2b and 2c). In some documents, the coach apparatus 1 may also be referred to as a coach robot or a coach agent, and the action robot may also be referred to as an action agent.

To simplify the description, only action robots 2a, 2b and 2c are depicted in FIG. 2. However, it shall be appreciated that, the number of the action robots is not intended to limit the present invention. The coach apparatus 1 may be may be a nearby device or a fog device with respect to the action robots. In other embodiments, the coach apparatus 1 may also play the role of an action robot at the same time, i.e., the coach apparatus 1 may also belong to one of the action robots. The communication between the coach apparatus 1 and the action robots 2a, 2b and 2c may be achieved by adopting one of a Narrow Band Internet of Things (NB-IoT) technology, a wireless local area network technology (e.g., WiFi) and a low power consumption wide area network technology (e.g., LoRa), but not limited thereto.

The coach apparatus 1 comprises a storage 11, a communication interface 13 and a processor 15. The storage 11 stores a reduced state space model RSSM, a cooperative learning model CLM and a strategy base SB. The communication interface 13 is configured to connect with a plurality of action robots (e.g., the action robots 2a, 2b and 2c). The processor 15 is electrically connected to the storage 11 and the communication interface 13.

The processor 15 receives state space data and goal information from each of the action robots 2a, 2b and 2c via the communication interface 13. The goal information records the goal that needs to be achieved and is selected from a goal base by the action robot in response to a strategy transmitted by the coach apparatus 1. The state space data of each action robots 2a, 2b and 2c carries the action robot's surrounding environment information including a self-position value, a moving object position value, a fixed object position value and a movable direction value. Each of the action robots 2a, 2b and 2c continuously generates new state space data when moving, and reports the new state space data back to the coach apparatus 1.

The self-position value, the moving object position value, the fixed object position value, the movable direction value and the state space data may all be represented by vectors. For example, taking a two-dimensional space as an example for illustration, the self-position value comprises a two-dimensional space coordinate value which may be represented as $A_p=(a_x, a_y)$, the moving object position value comprises a two-dimensional space coordinate value which may be represented as $M_o=(m_x, m_y)$, the fixed object position value comprises a two-dimensional space coordinate value which may be represented as $F_q=(f_x, f_y)$, and the movable direction value comprises the moving angle and the moving direction of the action robot, which may be represented as $D_n=(\theta, d_y)$, so the state space data may be represented as $St=<A_p, M_o, F_q, D_o>$. The implementation scenario of the three-dimensional space shall be readily appreciated by those of ordinary skill in the art based on the implementation scenario of the two-dimensional space, and thus the implementation scenario of the three-dimensional space will not be further described herein.

Figure 3B:
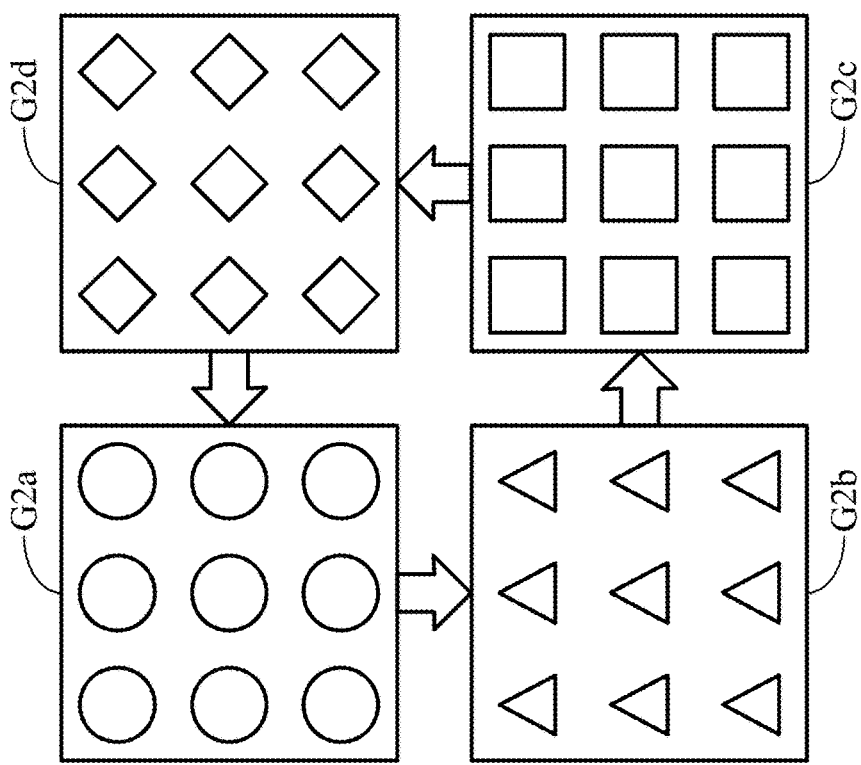
FIG. 3A to FIG. 3B depict schematic views of the grouping of action robots performed by the coach apparatus 1.
Figure 3A:
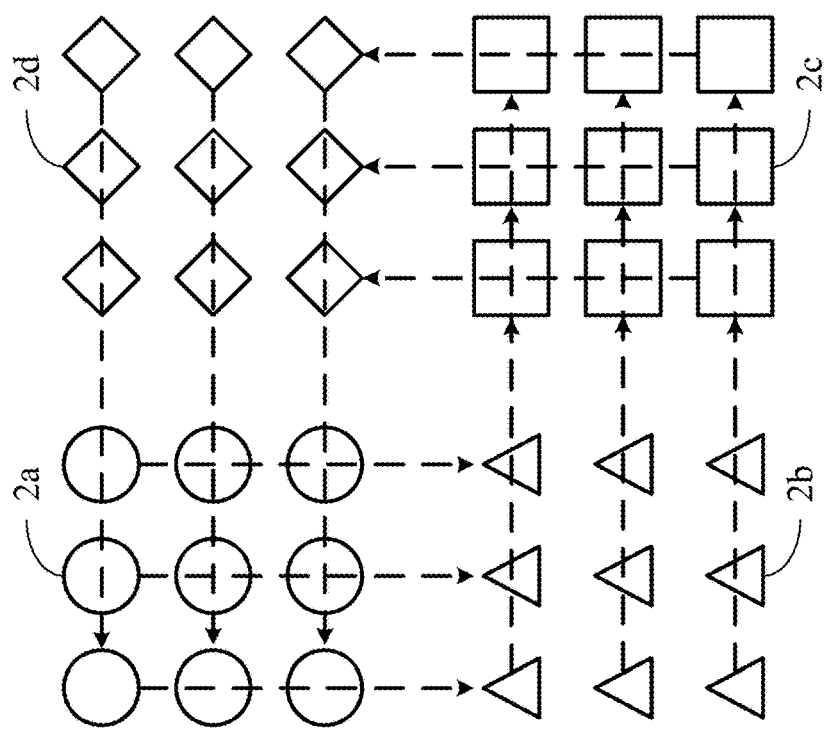

Next, the processor 15 divides the action robots into a plurality of action groups according to the goal information and the state space data. For example, as shown in FIG. 3A to FIG. 3B, the processor 15 dynamically divides the action robots into a plurality of action groups according to the goal information and the self-position values of the state space data. The action robots in each of the action groups are close to each other and have a common action goal, a common action behavior or a combination thereof.

In FIG. 3A to FIG. 3B, circles represent the action robots 2a, triangles represent the action robots 2b, squares represent the action robots 2c and rhombus represent the action robots 2d. It is assumed that all the action robots 2a move downward (i.e., move towards the position of the action robots 2b), all the action robots 2b move rightward (i.e., move towards the position of the action robots 2c), all the action robots 2c move upward (i.e., move towards the position of the action robots 2d), and all the action robots 2d move leftward (i.e., move towards the position of the action robots 2a). The coach apparatus 1 may group the action robots 2a that are close to each other and have the common action behavior into a same action group G2a, group the action robots 2b into a same action group G2b, group the action robots 2c into a same action group G2c and group the action robots 2d into a same action group G2d according to the self-position value, the action goal and the action behavior of each of the action robots, as shown in FIG. 3B.

After performing the grouping, the processor 15 inputs the state space data of each of the action agents in each of the action groups into the reduced state space model RSSM to generate reduced state space data. Each of the reduced state space data is generated through integrating at least one the state space data of at least one the action robots in the corresponding action group. Further speaking, for each of the action groups, the processor 15 calculates a group self-position value, a moving group value and a group movable direction value of each of the action groups through the reduced state space model RSSM according to the self-position values, the moving object values and the movable direction values carried in the state space data of the action robots in the action group.

In other words, the group self-position value of each of the action groups may be an average value or a geometric center-of-gravity value of the self-position values in the state space data of the action robots in the action group; the moving group value of each of the action groups is an average value or a geometric center-of-gravity value of the moving object values in the state space data of the action robots in the action group; and the group movable direction value of each of the action groups is an average value or a geometric center-of-gravity value of the movable direction values in the state space data of the action robots in the action group. Accordingly, the reduced state space data of each action group includes the group self-position value, the moving group value, the group movable direction value, and the fixed object position value sensed by each of the action robots in the action group.

The processor 15 inputs the reduced state space data to the cooperative learning model CLM to train and build a cooperative model based on a reinforcement learning algorithm. The reinforcement learning algorithm may for example be an improved epsilon-greedy (ε-greedy) algorithm, but not limited thereto. Moreover, in other embodiments, the communication interface 13 may further connect with a plurality of sensing devices. For example, the sensing devices may be fixed-point sensing devices such as an unmanned aerial vehicle for sensing weather, an unmanned vehicle for detecting ocean currents or sludge drifting directions or a camera for determining the traffic condition. In this case, the processor 15 further receives a plurality of sensed data from the sensing devices via the communication interface 13, and inputs the reduced state space data and the sensed data to the cooperative learning model CLM to train and build the cooperative model.

For each of the action groups, the processor 15 selects a group strategy from the strategy base SB according to the reduced state space data, and transmits the cooperative model and the group strategy to each of the action robots in the action group via the communication interface 13 to make each of the action robots in the action group carry out an action mission according to the cooperative model and the group strategy.

Further speaking, the action robots may stores a goal base, a cooperative model and an action base. The group strategy may be a moving strategy, e.g., a diagonal moving strategy, a deadlock moving strategy or the like. The goal base is configured to record the action goals of the action robots. The action base is configured to record basic actions of the action robots. Each of the action robots selects an action goal that needs to be achieved from the goal base according to the group strategy, and selects an action behavior that needs to be executed for achieving the action goal from the action base by inputting the action goal into the cooperative model. Therefore, the action mission carried out by each of the action robots is constituted by an action goal and an action behavior. How the action robots execute relevant operations based on the cooperative model and the strategy provided by the coach apparatus shall be appreciated by those of ordinary skill in the art based on the published technical documents and the technical contents disclosed by this application, and thus will not be further described herein.

Figure 4B:
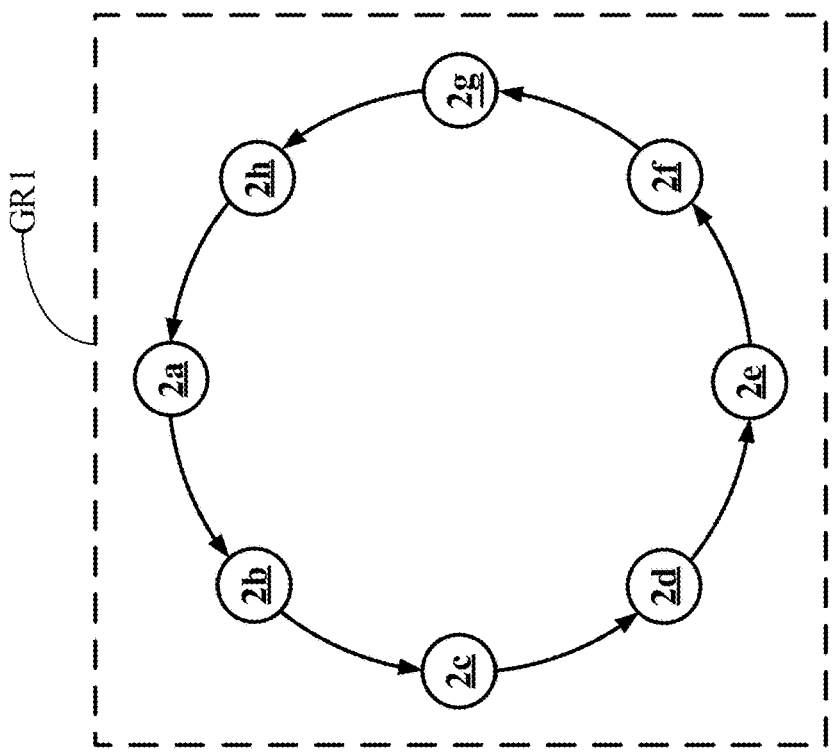
FIG. 4A to FIG. 4B depict schematic views of a group strategy.
Figure 4A:
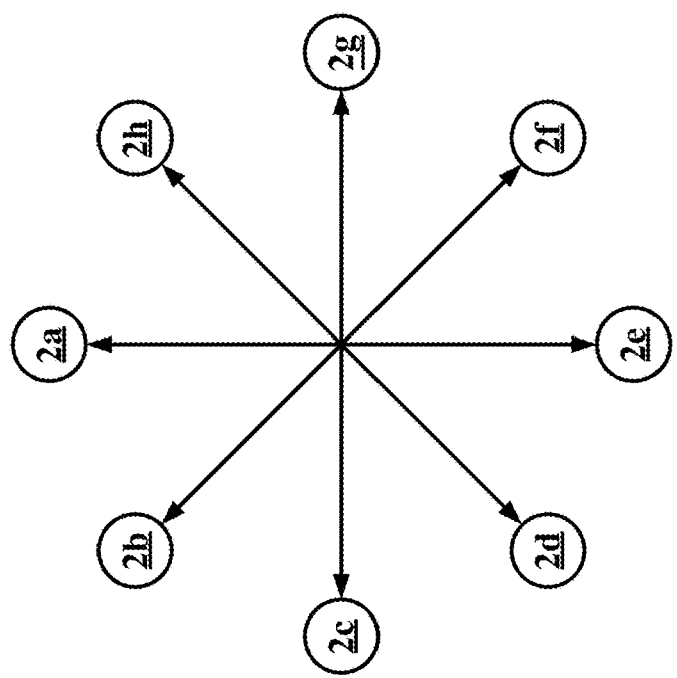

For example, please refer to FIG. 4A to FIG. 4B, which depict schematic views of selecting the group strategy by the coach apparatus 1. As shown in FIG. 4A, it is assumed that the position of the action goal of each of the action robots $2a$ to $2h$ is at the diagonal position thereof, i.e., the position of the action goal of the action robot $2a$ is the position where the action robot $2e$ is located, the position of the action goal of the action robot $2b$ is the position where the action robot $2f$ is located, the position of the action goal of the action robot $2c$ is the position where the action robot $2g$ is located, the position of the action goal of the action robot $2d$ is the position where the action robot $2h$ is located, the position of the action goal of the action robot $2e$ is the position where the action robot $2a$ is located, the position of the action goal of the action robot $2f$ is the position where the action robot $2b$ is located, the position of the action goal of the action robot $2g$ is the position where the action robot $2c$ is located, and the position of the action goal of the action robot $2h$ is the position where the action robot $2d$ is located.

The processor 15 determines that the action robots $2a$ to $2h$ have the same action behaviors (all of which are moving towards the diagonal direction), so the processor 15 groups the action robots $2a$ to $2h$ into a same action group GR1, as shown in FIG. 4B. However, if the action robots $2a$ to $2h$ all move towards the positions of the action goals in straight-line directions, the action robots $2a$ to $2h$ are likely to collide with each other when they are close to the central point. Since distances between the action robots are too short when the action robots are close to the central point, each of the action robots will continuously change the moving speed thereof in order to avoid the collision with each other. Thus, a large amount of data operation is generated, and the action time may also be increased because of changing the action path continuously.

Therefore, when the processor 15 determines that the action time of the action robots $2a$ to $2h$ may be reduced by making the action robots $2a$ to $2h$ in the action group GR1 all move around in the clockwise or counterclockwise direction so that each of the action robots $2a$ to $2h$ moves to the action goal thereof within the shortest time, the processor 15 may select the group strategy (e.g., the diagonal moving strategy) that is most suitable to the action group GR1 from the strategy base SB. In this way, the action robots $2a$ to $2h$ can all move around in the clockwise or counterclockwise direction according to the diagonal moving strategy, as shown in FIG. 4B.

Figure 5B:
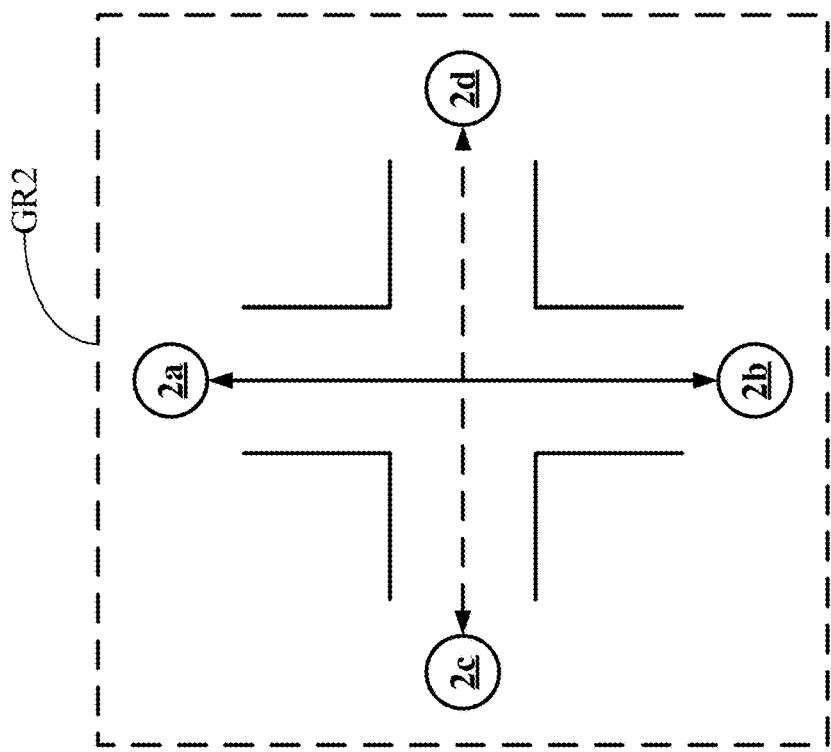
FIG. 5A to FIG. 5B depict schematic views of another group strategy.
Figure 5A:
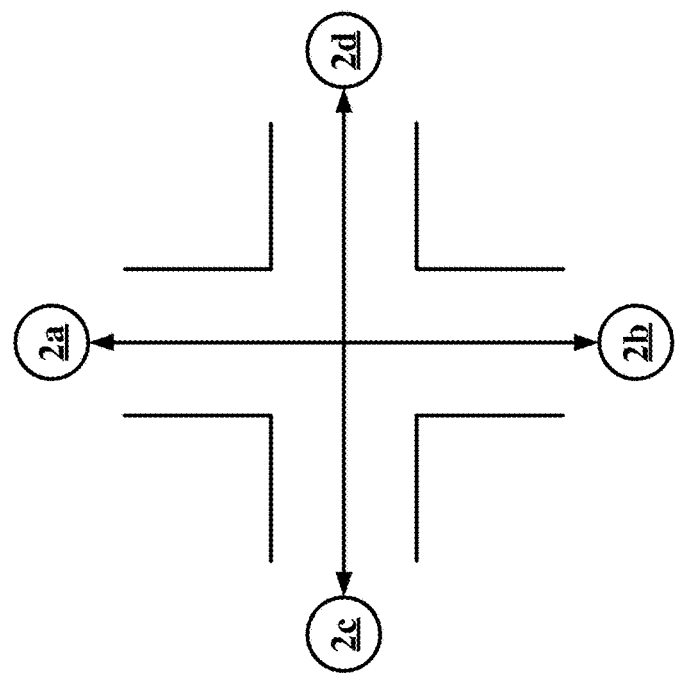

As another example, please refer to FIG. 5A to FIG. 5B, which depict schematic views of selecting the group strategy by the coach apparatus 1. In FIG. 5A, it is also assumed that the position of the action goal of each of the action robots $2a$ to $2d$ is the diagonal position thereof. Similarly, the processor 15 groups the action robots $2a$ to $2d$ into a same action group GR2 according to the action behaviors of the action robots $2a$ to $2d$. To avoid collision among the action robots $2a$ to $2d$ when the action robots $2a$ to $2d$ are moving towards the action goals, the action robot may first stay still and then continue to move towards the action goal after other action robots have passed by if distances between one action robot and other action robots are too short. However, if all the action robots $2a$ to $2d$ stay still for preventing collision with each other, then a deadlock state will occur in the action group, as shown in FIG. 5A.

In order to prevent the collision among the action robots or prevent the occurrence of the deadlock state in the action group, the coach apparatus 1 may select a deadlock moving strategy from the strategy base SB. The deadlock moving strategy may enable a part of action robots (e.g., action robots $2c$ and $2d$) in the action group GR2 to stay still when they determine that the distances from other action robots (e.g., action robots $2a$ and $2b$) are too short, and enable the action robots $2c$ and $2d$ to continue to move towards the action goals after the action robots $2a$ and $2b$ have passed by, as shown in FIG. 5B.

As described in the aforesaid description, the action robots will continuously generate new state space data when moving, and report the new state space data to the coach apparatus so that the coach apparatus 1 can update the state space data, the cooperative learning model CLM and the strategy provided to the action robots. In the conventional technology, the coach apparatus directly uses the state space data of the action robots to train the cooperative model. Thus, in the case where the state space data that needs to be computed is tremendous, the conventional coach apparatus cannot plan the optimal obstacle avoiding path in real time, so it is hard to bear the cooperative operation for obstacle avoidance of the multiple robots. In contrast, the coach apparatus 1 of the present invention first divides the action robots into a plurality of action groups, generates reduced state space data of each of the action groups through the reduced state space model RSSM, and then uses the reduced state space data to train the cooperative model, so the present invention can reduce the data amount required for training the cooperative model and thus reduce the training time, thereby achieving the objective of planning the optimal obstacle avoiding path in real time.

Please refer to FIG. 4A to FIG. 4B and FIG. 5A to FIG. 5B again for a second embodiment of the present invention. The second embodiment is an extension of the first embodiment. Different from the first embodiment, in this embodiment, the processor 15 may also enable each of the action robots in each of the action groups to select the group strategy to be used by the group to which the action robot belongs by executing a strategy selection procedure. In detail, the processor 15 selects a plurality of candidate strategies from the strategy base SB, generates a strategy voting message with the candidate strategies, and then transmits the strategy voting message to the action robots in the action group via the communication interface 13. The candidate strategies are selected by the coach apparatus 1 after evaluating which strategies in the strategy base SB are applicable to the action group based on the reduced state space data of the action group.

After receiving the strategy voting message, each of the action robots in the action group selects the group strategy that is most suitable for the group to which the action robot belongs from the candidate strategies, and generates and transmits a strategy selection message to the coach apparatus 1. After the processor 15 receives the strategy selection message from each of the action robots in the action group via the communication interface 13, the processor 15 determines the group strategy according to all the strategy selection messages, e.g., the group strategy having the highest number of votes.

For example, the candidate strategy selected by the coach apparatus 1 may includes the diagonal moving strategy and the deadlock moving strategy. In the implementation scenario depicted in FIG. 4A to FIG. 4B, among the eight action robots 2a to 2h of the action group GR1, five action robots select the diagonal moving strategy, and three action robots select the deadlock moving strategy. Thus, the coach apparatus 1 may determine that the action group GR1 uses the diagonal moving strategy according to the voting result, as shown in FIG. 4B.

As another example, in the implementation scenario depicted in FIG. 5A to FIG. 5B, among the four action robots 2a to 2d of the action group GR2, three action robots select the deadlock moving strategy, and one action robot selects the diagonal moving strategy. Thus, the coach apparatus 1 may determine that the action group GR2 uses the deadlock moving strategy according to the voting result, as shown in FIG. 5B.

In other embodiments, if the action robot determines that the current group strategy is not suitable for the action behavior thereof, the action robot may also directly transmit a strategy request message to request the coach apparatus 1 to change the group strategy. When the coach apparatus 1 determines that the number of the action robots transmitting the strategy request message in the action group exceeds a percentage of the total number of the action robots in the action group (e.g., exceeds a half of the total number), the coach apparatus 1 re-executes the strategy selecting procedure.

Moreover, in other embodiments, in addition to transmitting the strategy request message to request the coach apparatus 1 to change the group strategy, the action robots may also transmit a group leaving request message the coach apparatus 1 and leave the original action group to become an independent individual.

In other embodiments, if the coach apparatus 1 receives state space data and goal information from other action robots not belonging to the action group, the coach apparatus 1 may determine whether the other action robots have the same action goal or action behavior as the action robots in the adjacent action group according to the state space data and the goal information of the other action robots. If the other action robots have the same action goal or action behavior, then the other action robots are added into the adjacent action group.

Figure 6:
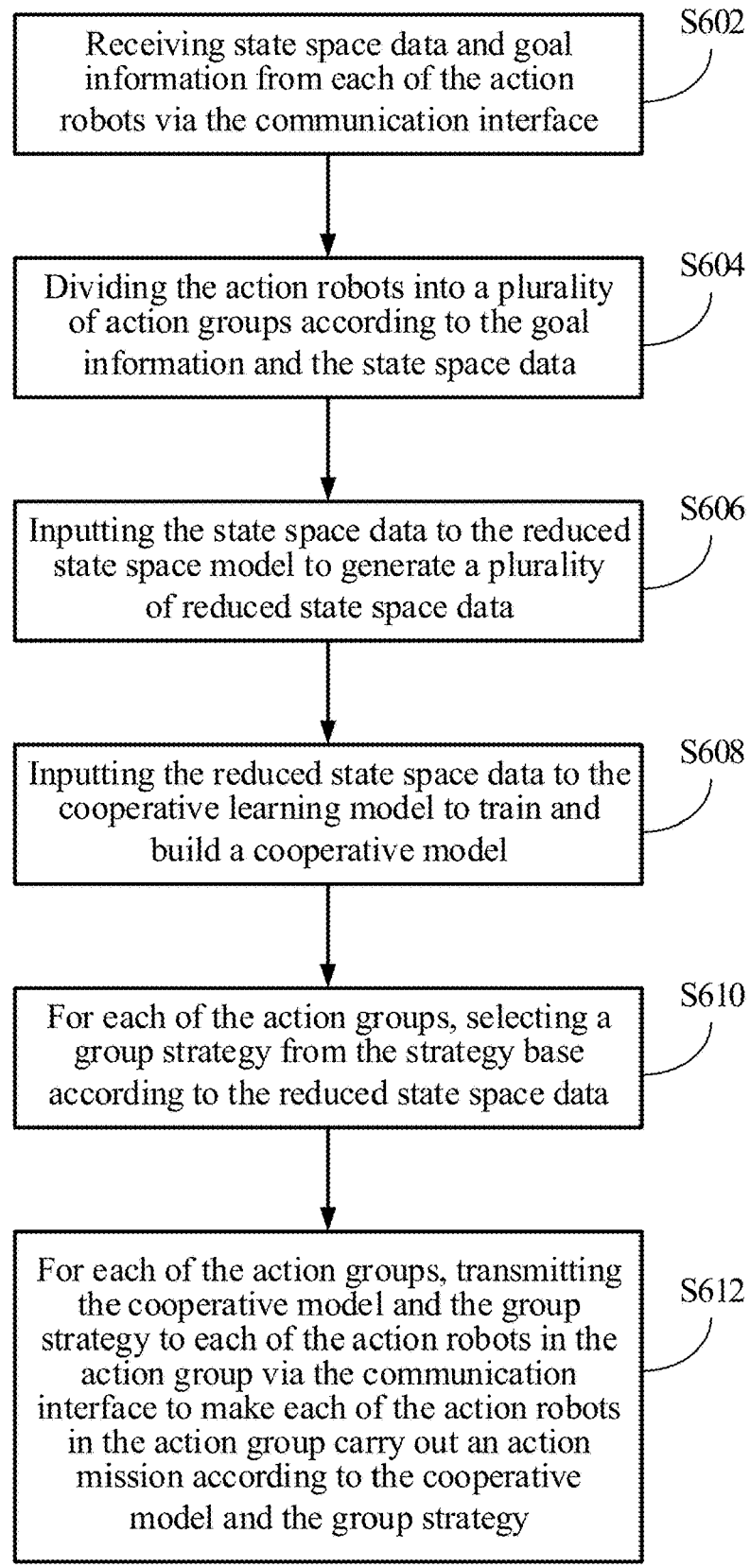
FIG. 6 is a flowchart diagram of the cooperative operation controlling method according to the present invention.

A third embodiment of the present invention describes a cooperative operation controlling method, and a flowchart diagram thereof is as shown in FIG. 6. The cooperative operation controlling method is adapted for use in a coach apparatus (e.g., the coach apparatus 1 of the aforesaid embodiments) for a coach-driven multi-robot cooperative operation system. The coach apparatus comprises a storage, a communication interface and a processor. The storage stores a reduced state space model, a cooperative learning model and a strategy base. The communication interface connects with a plurality of action robots. The cooperative operation controlling method is executed by the processor and comprises the following steps.

First, in step S602, state space data and goal information are received from each of the action robots via the communication interface. As described in the first embodiment, each of the state space data comprises a self-position value, a moving object position value, a fixed object position value and a movable direction value. In step S604, the action robots are divided into a plurality of action groups according to the goal information and the state space data. In step S606, the state space data are inputted to the reduced state space model to generate a plurality of reduced state space data. Each of the reduced state space data corresponds to one of the action groups, and each of the reduced state space data is generated through integrating at least one the state space data of at least one the action robots in the corresponding action group.

Next, in step S608, the reduced state space data are inputted to the cooperative learning model to train and build a cooperative model. In an embodiment, the cooperative learning model trains and builds the cooperative model based on a reinforcement learning algorithm. Thereafter, in step S610, for each of the action groups, a group strategy is selected from the strategy base according to the reduced state space data. In step S612, for each of the action groups, the cooperative model and the group strategy are transmitted to each of the action robots in the action group via the communication interface to make each of the action robots in the action group carry out an action mission according to the cooperative model and the group strategy.

In other embodiments, for each of the action groups, the cooperative operation controlling method further comprises the following step: calculating a group self-position value, a moving group value and a group movable direction value according to the self-position values, the moving object values and the movable direction values carried in the state space data of the action robots in the action group. The reduced state space data of each action group include the group self-position value, the moving group value, the group movable direction value and the fixed object position values of the action robots in the action group.

In other embodiments, the cooperative operation controlling method further comprises the flowing step: dynamically dividing the action robots into the action groups according to the goal information and the self-position values of the state space data. At least one the action robots in each of the action groups is close to each other and has a common action goal, a common action behavior or a combination thereof. Moreover, in other embodiments, the storage further stores an action robot database.

In other embodiments, for each of the action groups, the cooperative operation controlling method further comprises the following steps: selecting a plurality of candidate strategies from the strategy base; generating a strategy voting message with the candidate strategies; transmitting the strategy voting message to the action robots in the action group via the communication interface; receiving a strategy selection message from each of the action robots in the action group via the communication interface; and selecting the group strategy from the candidate strategies according to the strategy selection messages.

In other embodiments, for each of the action groups, the cooperative operation controlling method further comprises a step of: executing a strategy selecting procedure. The strategy selecting procedure comprises the following steps: determining whether a strategy request message is received from at least one of the action robots in the action group via the communication interface; determining whether a number of the action robots transmitting the strategy request message exceeds a percentage of a total number of the action robots in the action group; and re-executing the strategy selecting procedure when the number exceeds the percentage of the total number.

In other embodiments, the communication interface is configured to connect with a plurality of sensing devices, and the cooperative operation controlling method further comprises the following steps: receiving a plurality of sensed data from the sensing devices via the communication network; and inputting the reduced state space data and the sensed data to the cooperative learning model to train and build the cooperative model.

In other embodiments, the cooperative operation controlling method further comprises the following steps: receiving a group leaving request message for leaving the original action group and becoming an independent individual from one of the action robots via the communication interface, as described in the second embodiment. In other embodiments, the group strategy of each of the action groups is a moving strategy.

In addition to the aforesaid steps, the cooperative operation controlling method of the present invention can also execute all the operations described in all of the aforesaid embodiments and have all the corresponding functions, and how this embodiment executes these operations and have these functions shall be readily appreciated by those of ordinary skill in the art based on all of the aforesaid embodiments, and thus will not be further described herein.

According to the above descriptions, the cooperative operation mechanism of the present invention dynamically divides a plurality of action robots into a plurality of action groups according to the sensed information and goal information reported by the plurality of action robots, and reduces the state space data of the action robots in each of the action groups to reduce the data amount required for training the cooperative model and thereby reduce the training time. Moreover, the cooperative operation mechanism of the present invention can select a suitable group strategy based on the reduced state space data to increase the efficiency of cooperative operation of the action robots and achieve the optimal cooperative result. Accordingly, the present invention can reduce the data calculating amount required for the cooperative operation of the robots and providing optimal cooperative operation behaviors and response time.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A coach apparatus for a coach-driven multi-robot cooperative operation system, comprising:
   a storage, being configured to store a reduced state space model, a cooperative learning model and a strategy base;
   a communication interface, being configured to connect with a plurality of action robots; and
   a processor, electrically connected to the storage and the communication interface, being configured to execute the following operations:
   receiving state space data and goal information from each of the action robots via the communication interface;
   dividing the action robots into a plurality of action groups according to the goal information and the state space data;
   inputting the state space data to the reduced state space model to generate a plurality of reduced state space data, wherein each of the reduced state space data corresponds to one of the action groups, and each of the reduced state space data is generated through integrating at least one the state space data of at least one the action robots in the corresponding action group;
   inputting the reduced state space data to the cooperative learning model to train and build a cooperative model;
   for each of the action groups, selecting a group strategy from the strategy base according to the reduced state space data; and
   for each of the action groups, transmitting the cooperative model and the group strategy to each of the action robots in the action group via the communication interface to make each of the action robots in the action group carry out an action mission according to the cooperative model and the group strategy.

2. The coach apparatus of claim 1, wherein each of the state space data includes a self-position value, a moving object position value, a fixed object position value and a movable direction value.

3. The coach apparatus of claim 2, wherein for each of the action groups, the processor calculates a group self-position value, a moving group value and a group movable direction value according to the self-position values, the moving object values and the movable direction values carried in the state space data of the action robots in the action group, and the reduced state space data of the action group include the group self-position value, the moving group value, the group movable direction value and the fixed object position values of the action robots.

4. The coach apparatus of claim 2, wherein the processor dynamically divides the action robots into the action groups according to the goal information and the self-position values of the state space data, and at least one the action robots in each of the action groups is close to each other and has a common action goal, a common action behavior or a combination thereof.

5. The coach apparatus of claim 1, wherein for each of the action groups, the processor further executes a strategy selection procedure which comprises the following operations:
  selecting a plurality of candidate strategies from the strategy base;
  generating a strategy voting message with the candidate strategies;
  transmitting the strategy voting message to the action robots in the action group via the communication interface;
  receiving a strategy selection message from each of the action robots in the action group via the communication interface; and
  selecting the group strategy from the candidate strategies according to the strategy selection messages.

6. The coach apparatus of claim 5, wherein for each of the action groups, the processor further executes the following operations:
  determining whether a strategy request message is received from at least one of the action robots in the action group via the communication interface;
  determining whether a number of the action robots transmitting the strategy request message exceeds a percentage of a total number of the action robots in the action group; and
  re-executing the strategy selecting procedure when the number exceeds the percentage of the total number.

7. The coach apparatus of claim 1, wherein the communication interface is configured to connect with a plurality of sensing devices, and the processor further receives a plurality of sensed data from the sensing devices via the communication network and inputs the reduced state space data and the sensed data to the cooperative learning model to train and generate the cooperative model.

8. The coach apparatus of claim 1, wherein the processor further receives a group leaving request message from one of the action robots via the communication interface.

9. The coach apparatus of claim 1, wherein the cooperative learning model trains and builds the cooperative model based on a reinforcement learning algorithm.

10. The coach apparatus of claim 1, wherein the group strategy of each of the action groups is a moving strategy.

11. A cooperative operation controlling method for use in a coach apparatus for a coach-driven multi-robot cooperative operation system, the coach apparatus comprising a storage, a communication interface and a processor, the storage storing a reduced state space model, a cooperative learning model and a strategy base, the communication interface connecting with a plurality of action robots, the operation cooperative controlling method being executed by the processor and comprising:
  receiving state space data and goal information from each of the action robots via the communication interface;
  dividing the action robots into a plurality of action groups according to the goal information and the state space data;
  inputting the state space data to the reduced state space model to generate a plurality of reduced state space data, wherein each of the reduced state space data corresponds to one of the action groups, and each of the reduced state space data is generated through integrating at least one the state space data of at least one the action robots in the corresponding action group;
  inputting the reduced state space data to the cooperative learning model to train and build a cooperative model;
  for each of the action groups, selecting a group strategy from the strategy base according to the reduced state space data; and
  for each of the action groups, transmitting the cooperative model and the group strategy to each of the action robots in the action group via the communication interface to make each of the action robots in the action group carry out an action mission according to the cooperative model and the group strategy.

12. The cooperative operation controlling method of claim 11, wherein each of the state space data includes a self-position value, a moving object position value, a fixed object position value and a movable direction value.

13. The cooperative operation controlling method of claim 12, wherein for each of the action groups, the cooperative operation controlling method further comprising:
  calculating a group self-position value, a moving group value and a group movable direction value according to the self-position values, the moving object values and the movable direction values carried in the state space data of the action robots in the action group, and the reduced state space data of the action group includes the group self-position value, the moving group value, the group movable direction value and the fixed object position values of the action robots.

14. The cooperative operation controlling method of claim 12 further comprising:
  dynamically dividing the action robots into the action groups according to the goal information and the self-position values of the state space data, and at least one the action robots in each of the action groups is close to each other and has a common action goal, a common action behavior or a combination thereof.

15. The cooperative operation controlling method of claim 11, wherein for each of the action groups, the cooperative operation controlling method further comprises:
  executing a strategy selecting procedure which comprises the following steps:
    selecting a plurality of candidate strategies from the strategy base;
    generating a strategy voting message with the candidate strategies;
    transmitting the strategy voting message to the action robots in the action group via the communication interface;

receiving a strategy selection message from each of the action robots in the action group via the communication interface; and selecting the group strategy from the candidate strategies according to the strategy selection messages.

16. The cooperative operation controlling method of claim 15, wherein for each of the action groups, the cooperative operation controlling method further comprises:

determining whether a strategy request message is received from at least one of the action robots in the action group via the communication interface;

determining whether a number of the action robots transmitting the strategy request message exceeds a percentage of a total number of the action robots in the action group; and re-executing the strategy selecting procedure when the number exceeds the percentage of the total number.

17. The cooperative operation controlling method of claim 11, wherein the communication interface is configured to connect with a plurality of sensing devices, and the cooperative operation controlling method further comprises:

receiving a plurality of sensed data from the sensing devices via the communication network; and inputting the reduced state space data and the sensed data to the cooperative learning model to train and build the cooperative model.

18. The cooperative operation controlling method of claim 11 further comprising:

receiving a group leaving request message from one of the action robots via the communication interface.

19. The cooperative operation controlling method of claim 11, wherein the cooperative learning model trains and builds the cooperative model based on a reinforcement learning algorithm.

20. The cooperative operation controlling method of claim 11, wherein the group strategy of each of the action groups is a moving strategy.

* * * * *